Jan. 10, 1928.
W. V. ORR
1,655,875
SUCTION CLEANER
Filed April 3, 1922
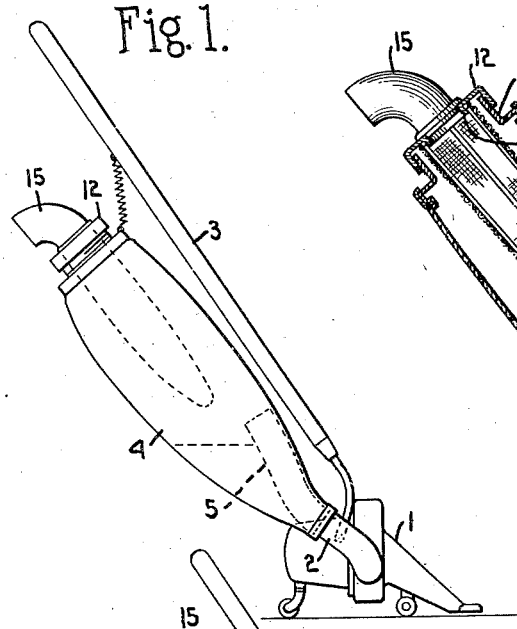
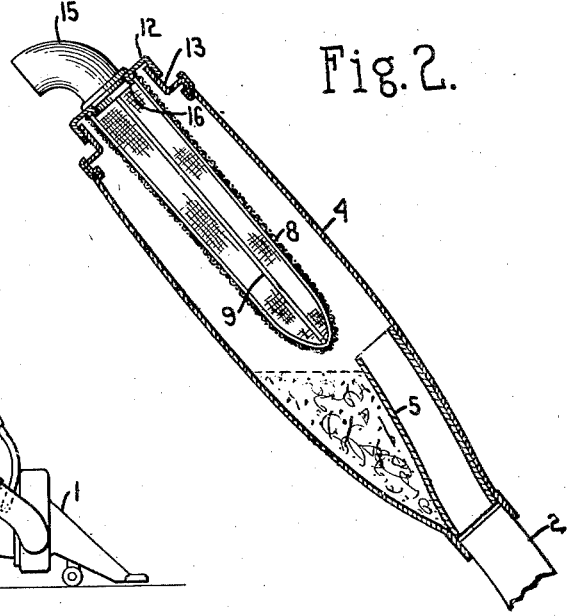
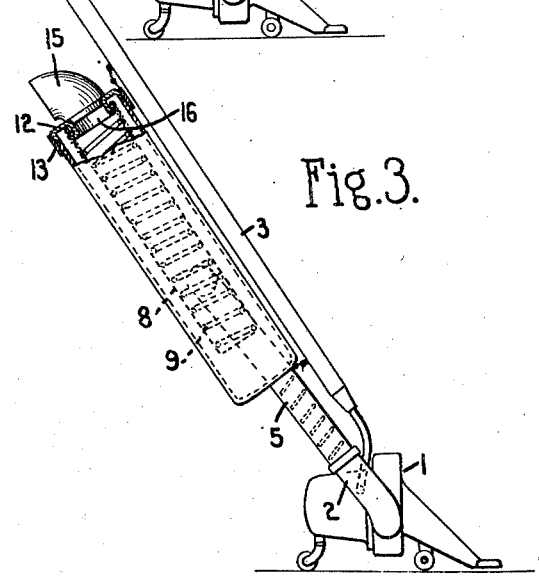
William V. Orr
INVENTOR.
BY
ATTORNEY.

Patented Jan. 10, 1928.

1,655,875

UNITED STATES PATENT OFFICE.

WILLIAM V. ORR, OF CLEVELAND, OHIO.

SUCTION CLEANER.

Application filed April 3, 1922. Serial No. 548,997.

This invention relates to suction cleaners and has for its object the provision of a new dust bag which is easily emptied and cleaned, less untidy and repulsive to the touch, superior in filtering ability, and comparatively safe from accidental injury or abrasion; while further objects and advantages will become apparent as the description proceeds.

The dust separator generally employed consists of a porous fabric bag which is supposed to leak air over its entire surface, retaining the dust, but the latter slowly works into the fabric and the entire bag eventually becomes repugnant to touch as well as giving off a visible cloud of dust particles whenever it is scratched or struck as often happens by accidental contact with furniture. Besides the interior of the bag becomes so matted with lint and dust adhering closely to the cloth fibers that cleaning it becomes a difficult and unpleasant task. The essence of my invention consists in making a bag for portable cleaners which filters inwardly instead of outwardly, thus enabling the employment of a fabric which has maximum filtering efficiency and ease of cleaning without regard to its physical strength since it is not subjected to hard use. As a result the exterior part of the dust separator becomes a container merely, without filtering requirements, and can be made of a substance which is more easily cleaned such as fiber, metal, leather, or oilcloth.

In the drawings accompanying and forming a part of this application I have shown certain physical structures in which my inventive idea can be embodied, although it will be understood that the same are intended only to be illustrative of the principles of my invention rather than exhaustive of the apparatus by which those principles can be utilized. Fig. 1 represents a suction cleaner equipped with my improved dust separator; Fig. 2 is a sectional view of the separator; and Fig. 3 illustrates a modified form of the invention.

Describing the parts by reference 1 represents generally a suction cleaner casing which can be of any size, style, shape, or kind, operated by electricity, foot, hand, or traction. 2 represents the outlet neck through which is expelled the dust laden air and 3 represents the handle by which it is manipulated. 4 represents the body of a container which is supported by the handle at one or more points and 5 represents a tube connecting said container to the neck. This tube preferably opens into the container at a considerable distance above its bottom so that dust and litter may not fall back into the same. It may be located either inside the container as shown in Figs. 1 and 2 or outside the same as shown in Fig. 3 and is preferably stiff and noncollapsible so as to afford a minimum of obstruction to the air stream. The container 4 is made of any suitable material but preferably a flexible impervious substance having a smooth interior to which dust will not adhere. Metal or fiber can be employed especially when an exterior tube is used as shown in Fig. 3, although I prefer oil cloth or leather, or one of the coated fabrics used for auto tops, preferably with the coated surface inside; these having the advantage over metal of lightness, cheapness, and freedom from giving or receiving dents and scratches.

Inside this container I mount a porous bag 8 which is held distended by a suitable frame 9 of wire, bamboo, or the like, the interior of the bag 8 being open to the atmosphere. In Fig. 2 the frame is made of expansible longitudinal members like the ribs of an umbrella and in Fig. 3 it consists of a wire helix. In either case it is attached to a closure member 12 which in turn is detachably secured to a ring or neck-piece 13 fastened to the container body. In Fig. 2 the closure is screwed to the neck piece and in Fig. 3 it is held by a pressed joint; in any event the closure is preferably provided with a deflector of some kind, such as the elbow 15, so as to divert the escaping air away from the operator's face. Interiorly the closure preferably has a flange 16 to which the frame 9 is fastened and around which the mouth of the bag 8 is tied.

This bag can be made of any one of many materials. I prefer a fine, porous silk because it offers a maximum of filtering capacity and is so smooth and glossy that dust and lint does not adhere thereto. By the use of such a highly porous fabric a sufficient filtering area is secured despite the small size of the inner bag and this small size, in turn, enables the profitable employment of a more expensive material. The interior, shielded position of this filtering bag enables considerations of strength to be disregarded in great part, so that thinner and lighter material can be employed, thereby increasing the effective power of the machine. Indeed it is even possible to use some grades of paper for this inner bag, which would be wholly impracticable for the outer bag.

Preferably the inlet tube 5 is arranged eccentrically so that a swirling action is produced in the annular space around the inner bag, thus tending to prevent the matting of lint thereon. Also whenever the cleaner is stopped and the air pressures become equalized most of the lint drops off, owing to the smooth nature of the filter bag and the springy nature of its supporting frame. Upon removing the closure 12 the contents of the container 4 can be emptied out freely and the filtering bag is presented in convenient position for brushing or shaking.

While I have described these physical embodiments in detail it will be understood that I do not limit myself to such details except as the same are specifically recited in my claims.

Having thus described my invention what I claim is:

1. In a suction cleaner, the combination with a portable casing having a pump chamber, and a discharge neck, an operating handle attached to the casing, an elongated dust container of flexible impervious material suspended from said handle and connected at its inlet end to said neck, and a hollow elongated, filtering member located inside said container and spaced from the walls thereof and having its interior communicating with the outer air.

2. In a suction cleaner, the combination with a portable casing having a pump chamber, and a discharge neck, an operating handle attached to the casing, an elongated dust container of flexible impervious material suspended from said handle and connected at its inlet end to said neck, said container having a reinforcing neck at its upper end, an apertured closure detachably connected to said neck, a frame carried by said closure and projecting into said container, and a flexible, porous, fabric enveloping said frame.

3. In a suction cleaner, the combination with a portable casing having a pumping chamber, and a discharge neck, an operating handle attached to the casing, an elongated dust container of flexible impervious material suspended from said handle and connected at its inlet end to said neck, and a hollow elongated filtering member removably supported inside said container at the opposite end from said neck.

4. In a device of the character described, the combination with a suction cleaner casing of the type having a pumping device, a discharge neck, and an operating handle, of an elongated, flexible-walled container suspended from said handle, a filtering bag of highly pervious material projecting into the upper end of said container, a distending frame inside said bag, and a flexible pipe connected at its inlet end to said discharge neck and opening into said container at a point above its lower end, the interior of said bag opening into the atmosphere.

5. A dust arrester for use with a suction cleaner casing of the type having a pumping device, a discharge neck, an operating handle and a dust arrester suspended from said handle, said dust arrester comprising an elongated member of flexible, impervious material, a removable apertured closure for the upper end of said member, a deflector carried by the outer side of said closure, a filtering member carried by the inner side of said closure, and a flexible pipe leading from said neck to said container.

6. A dust collector for suction cleaners comprising an elongated container of flexible impervious material adapted for attachment to the cleaner handle, a flexible pipe at one end of said container adapted for attachment to the outlet neck, and an internal elongated filtering member projecting into the other end of said container and having its interior communicating with the atmosphere.

7. A readily detachable dust collector for suction cleaners comprising an elongated container adapted for attachment to the cleaner handle, a flexible pipe at one end of said container adapted for attachment to the outlet neck, a removable closure for the other end of said container, and a hollow elongated filtering member carried by said closure and projecting into said container.

8. A readily detachable dust collector for suction cleaners comprising an elongated container adapted for attachment to the cleaner handle, a flexible pipe at one end of said bag adapted for attachment to the outlet neck, a removable, apertured, closure for the other end of said container, an elongated frame carried by said closure and projecting into said container, and a flexible, porous, filtering fabric enveloping said frame.

9. A closure for the dust bags of portable suction cleaners comprising a base part adapted for attachment to the bag wall, a flexible frame carried by said closure, and a filtering fabric enveloping said frame, said closure having an opening which communicates with the interior of said frame.

10. A dust collector for suction cleaners comprising an elongated container of flexible impervious material adapted for attachment to the cleaner handle, an elongated filtering member of flexible pervious material located inside said container and opening through one end thereof, and an inlet connection intermediate the ends of said container.

11. A dust collector for suction cleaners comprising inner and outer flexible bags defining an annular space between them, the inner bag being highly pervious and the outer bag substantially impervious, a distending frame inside the inner bag, and a flexible pipe opening into the outer bag at a point between its ends and adapted for attachment to the outlet neck of a cleaner.

12. A dust collector for suction cleaners, comprising pervious and impervious portions, both said portions being made of flexible material, the impervious portion forming a dust receptacle and the pervious portion forming a filter, and located wholly inside the impervious portion.

13. A dust bag for suction cleaners having an impervious storage portion, and a pervious filtering portion located wholly inside the impervious portion, both portions consisting of flexible fabric.

In testimony whereof, I hereunto affix my signature.

WILLIAM V. ORR.